March 17, 1970  L. A. HADDOCK, JR  3,500,725
REDUNDANT BRAKE ACTUATOR
Filed April 30, 1968
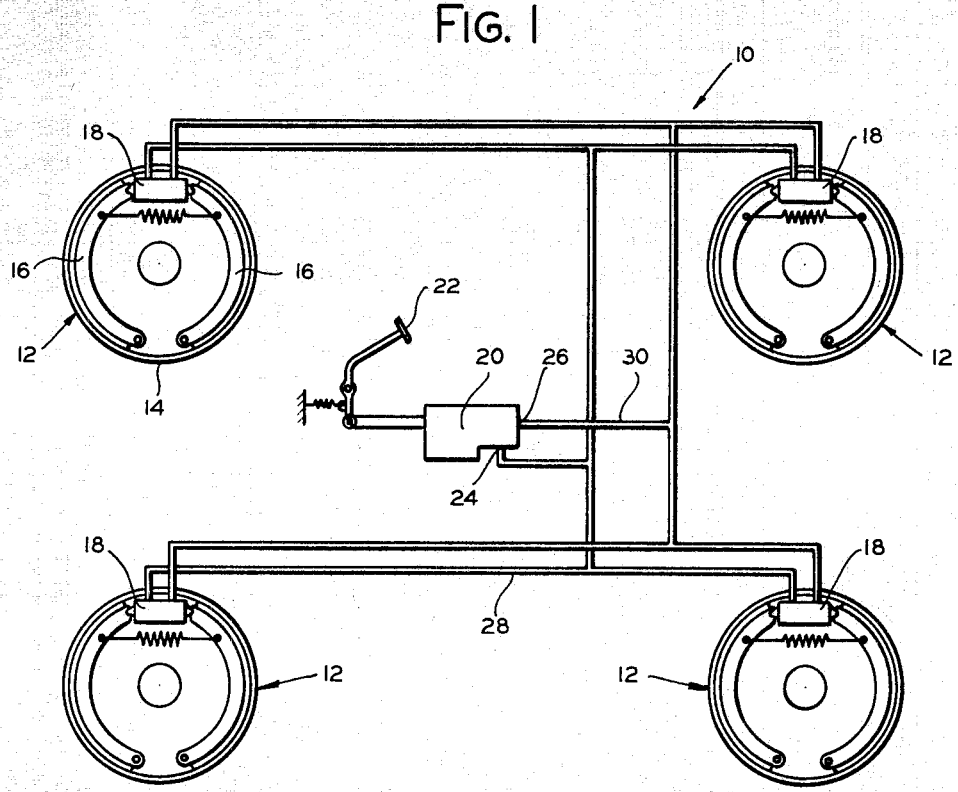
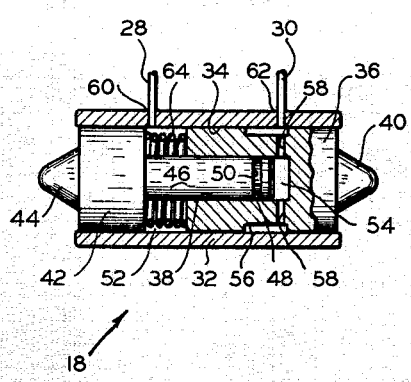
INVENTOR
LOUIS A. HADDOCK JR.
BY Robert H. Johnson
ATTORNEY

United States Patent Office 3,500,725
Patented Mar. 17, 1970

3,500,725
REDUNDANT BRAKE ACTUATOR
Louis A. Haddock, Jr., Battle Creek, Mich., assignor to Clark Equipment Company, a corporation of Delaware
Filed Apr. 30, 1968, Ser. No. 725,404
Int. Cl. F01b 7/20; F15b 15/08; B60t 11/10
U.S. Cl. 92—75                                  4 Claims

ABSTRACT OF THE DISCLOSURE

A dual brake system having a brake actuator at each brake and two separate conduit systems connecting the actuators to a dual master cylinder. Each actuator includes two separate chambers which are connected to different ones of the conduit systems.

BACKGROUND OF THE INVENTION

The field of art to which this invention relates includes brakes, and more specifically fluid operators for brakes.

A principal object of my invention is to provide a redundant brake actuator which is simple, low cost and easy to manufacture.

SUMMARY OF THE INVENTION

In carrying out my invention in a preferred embodiment there is provided a brake actuator having a body with a bore therein. Slidably disposed in the bore are first and second pistons which cooperate to form first and second separate chambers. First and second ports are located in the body, the first port communicating with the first chamber and the second port communicating with a fluid passage which communicates with the second chamber.

The above and other objects, features and advantages of my invention will be more readily understood when the detailed description is taken in conjunction with the drawing.

BRIEF DESCRIPTION OF THE DRAWING

FIGURE 1 shows schematically a brake system embodying my improved brake actuators, FIGURE 2 is a longitudinal section on an enlarged scale of my invention, and FIGURE 3 is similar to FIG. 2 except the actuator has been extended.

DESCRIPTION OF THE PREFERRED EMBODIMENT

Referring now to the drawing, the reference numeral 10 denotes generally a brake system using a plurality of internal expanding shoe type brakes 12. Each brake 12 includes a drum 14 and a pair of brake shoes 16, between which an actuator 18 is disposed, as shown. When actuator 18 is supplied with pressurized fluid it extends and forces shoes 16 outwardly into frictional engagement with drum 14, thereby applying brake 12.

Brake system 10 also includes a conventional dual master cyinder 20 which is operated by a foot pedal 22. When pedal 22 is depressed pressurized fluid is forced out of ports 24 and 26 of master cylinder 20. Connected to port 24 is fluid circuitry 28 which communicates pressurized fluid from port 24 to each of brake actuators 18. Similarly, fluid circuitry 30 is connected to port 26 and communicates pressurized fluid from port 26 to each of fluid actuators 18.

Referring now specifically to FIGS. 2 and 3, actuator 18 will be described in detail. Actuator 18 includes an elongated body 32 with a bore 34 extending longitudinally between the ends thereof. Slidably disposed in bore 34 is a piston 36 in which there is located a bore 38 which is open at one end only, as shown. Piston 36 also includes a projection 40 which is adapted to engage the adjacent end of a brake shoe 16 when actuator 18 is located in the brake, as shown in FIG. 1. Also slidably disposed in bore 34 is a piston 42 which includes a projection 44 adapted to engage the other brake shoe 16 of the brake with which the actuator is associated. Piston 42 also includes a longitudinally extending reduced diameter portion 46 which slidably engages bore 38, as shown in FIGS. 2 and 3. A seal is formed between reduced diameter portion 46 and bore 38 by means of a resilient O-ring 48 which is carried in an annular groove 50 in the surface of reduced diameter portion 46.

At this point it will be clear that piston 36, bore 34, piston 42 and reduced diameter portion 46 define an annular chamber 52. Further, reduced diameter portion 46 defines with bore 38 a chamber 54 which is separate from chamber 52. It will be noted that a compression spring 64 is disposed in chamber 52. This spring simply serves to bias pistons 36 and 42 outwardly in order to maintain projections 40 and 42 firmly in contact with the adjacent ends of brake shoes 16 at all times.

An annular groove 56 is located in the periphery of piston 36 and a plurality of passages 58 connect groove 56 with chamber 54, groove 56 and passages 58 serving as fluid passage means communicating with chamber 54. Located in body 32 is a port 60 which is connected to fluid circuitry 28 and communicates with chamber 52. Also located in body 32 is a port 62 which is connected to fluid circuitry 30 and communicates with groove 56.

In order to enable persons skilled in the art to better understand by invention, I will now explain the operation of it.

It will be assumed that brake actuators 18 are embodied in a brake system of the type shown in FIG. 1. Now, when the operator wishes to engage brakes 12 it is necessary for him to depress pedal 22, thereby operating master cylinder 20 to force pressurized fluid out of ports 24 and 26 and hence through fluid circuitry 28 and 30 to chambers 52 and 54 of each actuator 18. As a result, pistons 36 and 42 are forced away from each other, thereby causing brakes 12 to engage.

In the event that there should occur a rupture in fluid circuitry 28 so that actuation of master cylinder 20 will not serve to supply pressurized fluid to chamber 52 of each actuator 18, the actuation of master cylinder 20 will nontheless still serve to supply pressurized fluid via fluid circuitry 30 to chamber 54 of each actuator 18. As a result, each actuator will still be operable to apply brakes 12, although, with a somewhat reduced force.

Similarly, should fluid circuitry 30 be ruptured so that pressurized fluid cannot be supplied to chamber 54 of each actuator 18 when master cylinder 20 is operated, pressurized fluid will nontheless still be supplied via fluid circuitry 28 to chamber 52 of each actuator 18 so that actuators 18 can still be operated to engage brakes 12.

At this point it will be obvious that I have provided a simple brake actuator which is redundant in operation. That is, it is adapted to be connected to two separate sources of pressurized fluid so that should either source of pressurized fluid fail the actuator can be operated with the other source of pressurized fluid, thereby greatly increasing the safety of the brake system in which it is incorporated.

While only a single preferred embodiment of my invention has been described in detail, it is to be understood that this description is intended to be illustrative only, and that various changes and modifications can be made to my invention without departing from the spirit and scope of it. Therefore, the limits of my invention should be determined from the following claims.

What is claimed is:

1. For use with a brake having first and second brake shoes, a brake actuator comprising a cylindrical open ended body, a first bore member defining a first piston slidably disposed in the said first bore for actuating the first brake shoe, the said first piston having a second bore therein, a second piston slidably disposed in the said first bore for actuating the second brake shoe, the said second piston including a reduced diameter portion slidably disposed in the said second bore, the said second piston defining with the said first bore and first piston a first chamber, the said reduced diameter portion defining with said second bore a second chamber, fluid passage means in the said first piston which communicates with the said second chamber, a first port in the said body which communicates with the said first chamber, and a second port in the said body which communicates with the said passage means so that supplying pressurized fluid to either of the said ports operates both of the said pistons to actuate the brake shoes.

2. A brake actuator as set forth in claim 1 wherein the said fluid passage means includes an annular groove in the outer periphery of the said first piston and at least one fluid passage connecting the said groove with the said second chamber.

3. A brake actuator as set forth in claim 1 and including a compression spring disposed in the said first chamber for biasing the said pistons apart.

4. A brake actuator as set forth in claim 2 and including a compression spring disposed in the said first chamber for biasing the said pistons apart.

References Cited

UNITED STATES PATENTS

| | | | |
|---|---|---|---|
| 2,398,910 | 4/1946 | Pontios | 60—54.6 XR |
| 2,972,866 | 2/1961 | Oswalt | 60—54.6 XR |
| 3,056,264 | 10/1962 | Huntress et al. | 60—54.6 XR |
| 3,128,846 | 4/1964 | Stelzer | 60—54.6 XR |
| 3,268,038 | 8/1966 | Bauman | 92—75 |
| 3,292,371 | 12/1966 | Belart | 188—152 |
| 3,355,887 | 12/1967 | Balster | 188—152 XR |
| 3,382,675 | 5/1968 | Wallace | 188—152 XR |
| 3,403,602 | 10/1968 | Brandon | 92—75 XR |

MARTIN P. SCHWADRON, Primary Examiner

L. J. PAYNE, Assistant Examiner

U.S. Cl. X.R.

60—54.6; 92—51; 188—152.82